Figure 1:
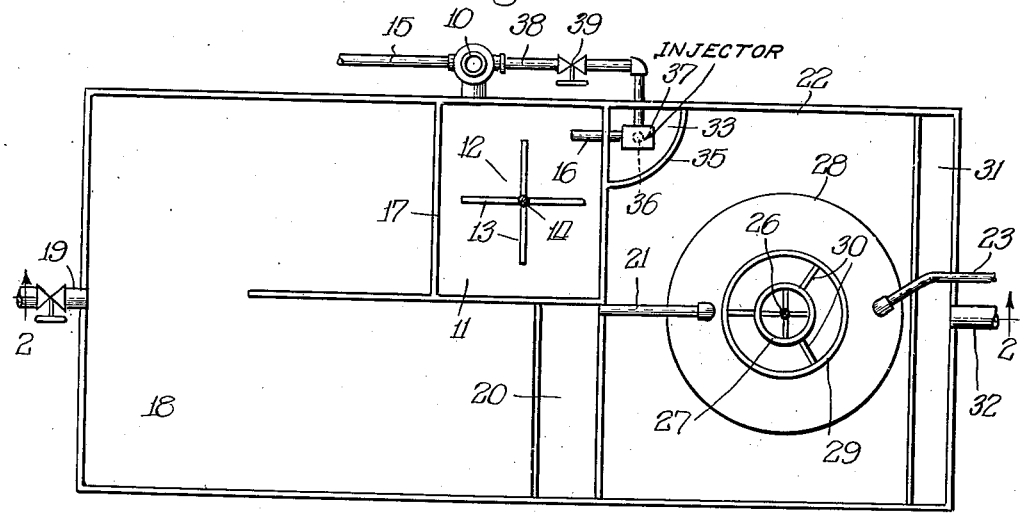

May 2, 1944.   W. H. GREEN   2,348,122
LIQUID TREATMENT
Filed May 29, 1940

INVENTOR.

Patented May 2, 1944

2,348,122

UNITED STATES PATENT OFFICE 2,348,122

LIQUID TREATMENT

Walter H. Green, Chicago, Ill., assignor to Infilco Incorporated, a corporation of Delaware Application May 29, 1940, Serial No. 337,766

10 Claims. (Cl. 210—16)

This invention relates to liquid treatment and particularly to apparatus and process wherein water or sewage is purified of a number of impurities of different types. The invention has particular utility in the treatment of waters containing both turbidity and hardness in excessive amounts either seasonally or throughout the year. The invention will be specifically described and illustrated as applied to a water of such kind, it being understood that the actual scope of application is considerably broader.

A general object of my invention is to initially remove one type or group of impurities from such water, to subsequently form and collect in the water so purified a concentrated slurry of heavy particles of another type or group of impurities and to return and utilize such slurry for the process of removing the first type of impurities.

A particular object is to utilize such slurry as seed, in the process for removing the first type of impurities.

Another object is to utilize such slurry as a weighting agent for the first type of impurities.

Another important object is to mix water with a conventional coagulating agent and a physical agent precipitated from previously treated water, thereby to rapidly produce composite particles containing nuclei of the physical agent coated by or adhering to relatively small flocs of the coagulating agent, said flocs in turn enveloping the particles which cause turbidity, to rapidly settle such composite particles, then to mix the settled water with a conventional hardness precipitating agent so as to rapidly and completely treat the water and to produce a concentrated slurry of particles precipitated therefrom, a portion of said slurry being retained and circulated in said precipitating step to promote the reactions therein, and another portion being transferred to and circulated in said coagulating step, whereby said physical agent for that step is provided.

A more particular object is to provide such a process wherein coagulation is caused and substantially completed in a zone of rapid mixing without the customary slow mix.

Another particular object is to ultimately dispose of the bulk of the solid waste products of the process in a single zone.

Another object is to construct apparatus for carrying out the processes referred to comprising a shallow concentrator serving the softening or precipitating step and adapted to collect the necessary amount of slurry for transfer to the coagulating step and to control the quantity of slurry circulating in the softening or precipitating zone.

Still another object is to construct a plant or device affording suitable treatment and disposal chambers for the several materials involved, including particularly a rapid mixing chamber, a settling chamber communicating therewith, a mixing, circulating and clarifying chamber communicating with said settling chamber, and a concentrating chamber communicating with said mixing, circulating and clarifying chamber and located adjacent or close to said rapid mixing chamber, so that the path for slurry returning to the rapid mixing chamber may be a short and relatively unobstructed one.

Figure 2:
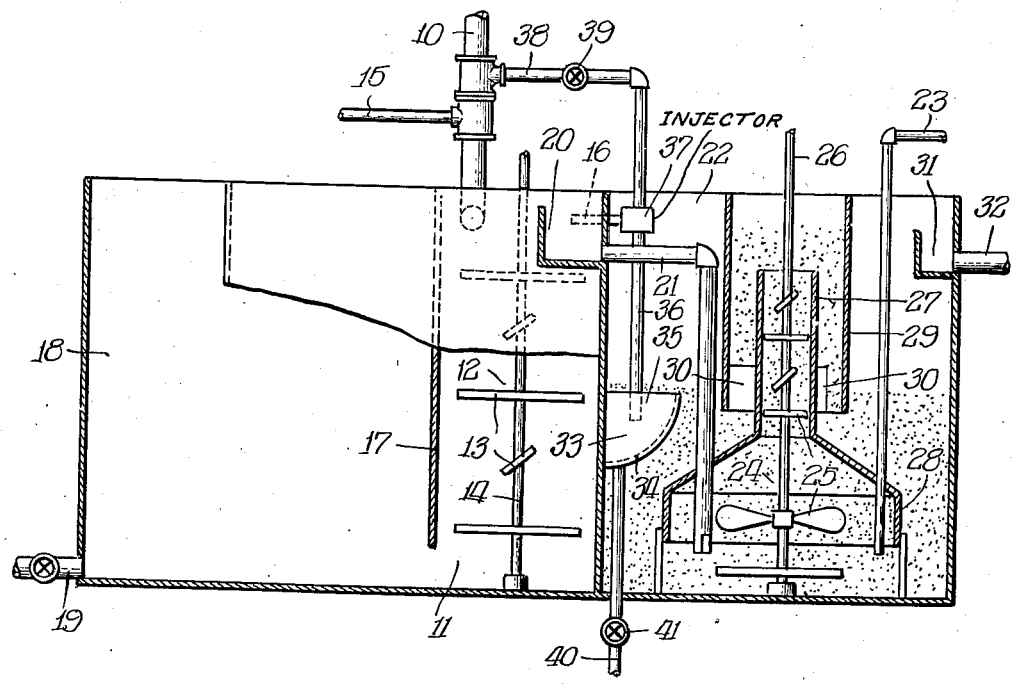

I am aware of various prior methods for the removal of plural impurities from water. Such earlier methods can be classified in two groups. In one group attempts have been made to remove all impurities, for instance, turbidity and hardness from the water in a unitary zone of treatment wherein the several reagents such as alum for the turbidity removal and lime soda for the hardness removal were simultaneously applied or caused to chemically or physically react to remove the desired impurities. Due to the complexity of the substances responsible for hardness, turbidity, etc., and also due to seasonal changes in the amounts thereof, and other complications, it is difficult to remove the same by plural simultaneous steps, particularly if stress be laid on avoiding unnecessary waste of treating agents, time, space and power. Therefore, in another group of methods it has been proposed to effect treatment in a plurality of consecutive stages or phases devoted respectively to the several major purposes of the treatment. My method is an improvement over earlier ones using such a plurality of treatment stages. This will be understood when reference is had to the following description in connection with the drawing, wherein Fig. 1 is a plan view of a preferred embodiment of apparatus adapted to carry out my new method and Fig. 2 is a sectional elevation thereof, the section being taken along line 2—2 of Fig. 1.

The plant or apparatus which I am about to describe inherently comprises a plurality of chambers, tanks or zones of treatment. In many instances one or more of the chambers or tanks need not be newly made but existing structures, such as old coagulators or settlers or the like can be utilized in producing the new and improved combination. This is especially so where the demand has outgrown existing facilities for water treatment; where the daily flow rate must be increased, or the standard of purification raised. It is an advantage of this invention that it provides an expanded and improved treatment system and also allows continued use in slightly modified manner of such existing devices.

The conduit 10 for hard and turbid water to be treated enters the first stage mixing basin 11 equipped with agitator 12. This agitator comprises rotating blades 13 of conventional design and a vertical shaft 14 carrying said blades, driven by a motor (not shown) and running at a suitable speed so that the peripheral velocity of blades 13 may be of the order of about 3 to 10 ft. per second. Alum or the like can be introduced in mixing chamber 11 through the chemical feed line 15 although in some cases no coagulant is needed at all if electrochemical and other pertinent conditions prevailing in the water favor coagulation, the necessary particle collisions being brought about by operating the agitator. Slurry from a subsequent step in the process enters mixing chamber 11 through line 16. Water with composite particles of coagulate and return slurry suspended therein leaves the mixing chamber 11 near the bottom thereof, passing under baffle 17 and enters the settler or clarifier 18. Here the composite particles are removed from the water by sedimentation. The settled sludge of composite particles is withdrawn from the settler intermittently through a valved drain 19.

Clarified water is collected in trough 20 installed in settler 18 thereby controlling the water level therein, and is withdrawn from trough 20 by a pipe 21 discharging into the softening basin 22. Also terminating in softening basin 22 is a feed line 23 for softening reagents. An agitator and impeller 24 having blades 25 is installed in softener 22 on a rotatable vertical shaft 26 driven by a motor (not shown). This agitator is surrounded by a draft tube 27 which has an enlarged lower portion or hood 28. The upper part of the draft tube, 27, is in turn surrounded by a tube 29. A number of vertically extending baffles 30 are installed between tubes 27 and 29 adjacent the lower part of the latter to suppress or control rotation of liquid in the outer portion of the softening basin 22. An overflow trough 31 for treated water controls the level of water in softening tank 22, and treated water is withdrawn from trough 31 through a pipe 32. The inner draft tube 27 and hood 28 extend from an elevation a few inches below the level of overflow trough 31 to an elevation a few inches above the bottom of tank 22; and the outer tube 29 extends from an elevation somewhat above overflow trough 31 to an elevation somewhat above the hood 28. A slurry composed of water containing particles separated from previously treated water is collected in the bottom of chamber 22. The propeller 25 is rapidly rotated thereby producing extensive turbulence under the hood 28 and causing an upward flow of slurry through tube 27, thence down through tube 29, outwardly over the top of hood 28, thence downwardly and along the wall of the chamber and finally convergently into the hood. During this rapid circulation of the slurry chemicals are added through line 23. Clarified water from line 21 is intimately mixed with the slurry and chemicals. The tubes 27 and 29 and the hood 28 function to provide a turbulent mixing zone for the incoming water, chemicals and slurry and to provide a closed fountain type of circulation in said mixing zone.

A slurry concentrator 33 is installed in softener 22 having a side wall 34 formed to provide a horizontal upper edge 35 located approximately at the elevation of the lower edge of outer draft tube 29. The mouth or horizontal top area of the concentrator confined by said edge 35 and by the wall of the softener tank 22 should be sufficient to afford concentrating and removing capacity for the amount of slurry to be removed for proper control; such area and amount being interrelated in a manner that will become obvious to persons skilled in the art on consideration of the operation of the device. The depth of concentrator 33 can be small; in effect the concentrator can take the form of a shallow bowl or channel, thereby saving valuable space in the lower part of softening tank 22.

The suction pipe 36 of an injector 37 extends only part way into concentrator 33, leaving a space below in which deposits and thickening of solids may take place. Injector 37 receives pressure water from source 10 through a pipe 38 provided with an adjustable valve 39, and discharges into mixing chamber 11 by return pipe 16. On any variation of input through pipe 10 it is necessary to readjust the feed of coagulant and softening reagent, by means well known and not shown, and also to readjust the return of slurry from softener 22 to coagulator 11 by valve 39, for proper control of operation. Should it become necessary to remove a considerable amount of slurry from concentrator 33 for proper control of softener 22, in excess of the demand of the coagulator 11, then part or all of the excess slurry can be discharged to waste through an auxiliary drain 40 leading from the concentrator. In normal operation drain 40 is closed by a valve 41.

Preferably, as shown in the drawing, the coagulator-settler 11, 18 and softener-concentrator 22, 33 will adjoin one another endwise, and the rapid mixer 11 and concentrator 33, will be located in adjacent corners of the respective units, whereby the return conduit 36, 16 can be very short and return slurry will be protected from destruction due to frictional flow in this conduit; also the size and cost of injector 37 or equivalent parts can be reduced and piping saved.

In operation hard and turbid water entering from source 10 is initially subjected to agitation or turbulence in mixer 11 desirably at a rapid rate such as that which results from paddles 13 moving through the water at a peripheral speed of more than 3 feet per second, and in some cases at a peripheral speed such as 10 feet per second. The water is agitated and mixed together with some alum or other coagulant added by chemical feed line 15, which agitation and mixing results in formation of flocs of aluminum hydroxide and the like. Simultaneously, I mix the water with a precipitate produced in the subsequent softening step. The formation and precise nature of the precipitate will be described in due course. Suffice it to say at this place that as a rule it is chemically stable and neutral as to the hard and turbid water entering through line 10 and that it has certain physical characteristics including specific weight, surface structure and interior structure allowing and promoting its agglomerating with other particles. Newly formed flocculi of aluminum hydroxide or the like will readily agglomerate with such precipitate and firmly adhere to the same as well as to one another and to colloidal matter to be coagulated, on rapid stirring. The aforementioned features of the precipitate also prevent destruction thereof or of the particles including the same due to rapid stirring. All this allows the resultant particles of composite flocs to attain a high specific weight and large size causing rapid sedimentation thereof in settler 18. The rapid mixing in mixer 11 may last about five minutes, or generally may last a suitable period in excess of that necessary for dispersing and distributing the chemical reagent, the excess period serving the coagulating reactions.

Following this prolonged rapid mixing and preferably without any intervening period of slow mixing, I re-establish quiescent conditions in the water by flowing it through settler 18 so that the coagulates may settle out. Being weighted by said precipitates, and built up to large particle size the composite flocs settle promptly and completely. Thus I effect removal of turbid matter, color or the like rapidly, efficiently and economically.

I then withdraw clarified water through pipe 21 into softener 22. Here I mix the clarified water with lime and soda or other reagents known to the art, entering through chemical feed line 23. I effect such mixture and cause the resulting reactions to occur within a concentrated suspension or slurry of solid particles formed in water previously treated in this stage. I continuously circulate a supply of such slurry for use in this softening stage. In one part of this circulation within hood 28 and tube 27, I introduce the clarified water, entering this stage and the softening reagent and apply turbulent mixing motion at a rate generally similar to that applied in the coagulating zone 11. In another part of this circulation outside tube 27 and hood 28 I cause the treated water to emerge from said circulating slurry. Preferably in so doing I maintain the slurry in suspension against sedimentation; especially so in the bottom part of the slurry where sedimentation is likely to occur. On introducing the water and softening chemicals into this slurry circulation under hood 28 insoluble products of softening reactions are precipitated so as to form hard and heavy particles, comprising crystal clusters of calcium carbonate or the like. (Up to this point the second stage or softening treatment hereof when considered without regard to the first stage or coagulating process is similar to that set forth in the patent issued to Walter J. Hughes, No. 2,245,587.)

I have discovered that the slurry described is potentially useful as a physical agent in the preceding coagulation step, the particles thereof being hard and heavy and adapted to firmly adhere to flocs of aluminum hydroxide or similar substances.

In order to effect a return of slurry to said coagulation stage and also for necessary control of the amount and condition of slurry present in the precipitation stage, I continuously collect in concentrator 33 certain portions of the slurry from the precipitation stage. I withdraw the slurry at or near the upper limit of the slurry in the precipitation zone. This upper limit develops in the form of a clear-cut, horizontal plane in that part of the tank 22 outside tubes 29 and 27 and hood 28 in which concentration of the slurry takes place.

I may subject the slurry withdrawn from circulation to additional concentration, although it is not generally necessary to obtain a very high degree of further concentration for use of the slurry in the coagulating stage.

In effecting the transfer or return of slurry from the second to the first stage I take care to prevent destruction of the slurry particles and to preserve them in the desirable physical condition that has been specified so that they may not only adhere to the coagulate but may form weighting agents or seeding nuclei of proper size and weight. For this and other purposes I prefer to limit the length of the return flow passage 36, 37, 16 from the second to the first stage and to make the cross-sectional area of the passage such as to avoid undue friction. For best operation of the coagulating step I make the flow of return slurry a continuous one.

The return of calcium carbonate slurry to the coagulation stage of this process is effected for purely physical or mechanical purposes, the crystalline particles of the slurry being substantially chemically stable and being used as purely physical agents. For one thing, such return of slurry offers a convenient method of ultimately disposing of all solid wastes of the combined coagulating and softening processes in the form of a sludge settling in a single zone, such as settler 18. Furthermore, it improves the clarifying process in coagulator 11, 18. In earlier methods both of coagulation and precipitation the solid particles produced thereby were extremely delicate and destructible. Therefore, the rapid mixing that was needed for uniform distribution or dispersion of chemical treating reagents had to be followed by a time consuming and expensive step of slow mixing, this being necessary to afford a sufficient number of particle collisions for agglomeration while avoiding destruction of particles. It has occurred to me that in many cases each particle of a newly formed coagulate resulting from an ordinary or somewhat prolonged rapid mixing of coagulant and water is able, prior to or without any slow mixing, by virtue of its inherent electrochemical and other properties to attract and envelop its due share of the finely distributed matter causing turbidity, color and the like. The particle may only be too light to settle as fast as is necessary for economical operation or the building up thereof may be slow or insufficient in the absence of large nuclei or seeds upon which the particle could deposit. The prior art expected the coagulate floc, including colloidal particles of turbidity enveloped by the floc, to gain both weight and substance by the process of slow mixing. I build up a composite and rapidly settleable floc by rapidly mixing and combining newly formed coagulate flocs with nuclei or seeds of a material adapted to supply the necessary weight, to withstand such rapid mixing and to firmly adhere to and combine with the coagulate so that the composite floc may withstand the rapid mixing.

My source of such material is a very convenient one. It is the concentrator 33 where excess solids resulting from the precipitating or softening process are collected. In earlier methods contemplating a precipitation process after a coagulation step, nothing would have been gained by introducing the precipitate formed in the second step into the rapid mixing zone of the coagulator. The precipitate was practically as delicate as the coagulated particles. Rapid mixing would have destroyed their texture and their value, if any, as seeding or weighting agents. On the other hand, when seeding or weighting agents were employed that could withstand the turbulence of a rapid mixer and were otherwise adapted to meet the complex conditions encountered this involved the purchase, treatment, storage, feed and dispersion in water of material such as ground limestone or the like. Such procedure is considerably more expensive than using slurry formed in the process.

Also the processes available to the prior art left the problem of ultimately disposing of precipitate unsolved whereas in my new process such solids are disposed of simply and conveniently, along with the coagulator sludge.

While I have emphasized that I can dispense with slow mixing in the coagulating zone 11, 18, my process can be combined with such operation, if so desired, and the benefits of the return slurry still be obtained. In such an event the combined mixing operations applied for coagulation can be shortened, the power expenditure decreased and the settleability of the ultimate floc enhanced.

The term "slurry" is used herein and in the appended claims in the sense in which it is commonly used in the water treating art at the present time, namely, as designating a suspension containing an amount of solids substantially greater than are present or formed in the liquid, and which results from accumulation or return of such solids from previously treated liquid; and in which the particles are formed, retained and used while being continuously held in suspension. During the normal operation of a slurry process the particles are formed and retained in suspension as long as the slurry is used, and are not permitted to deposit until it is desired to remove the particles from the apparatus and process. It is a common feature of slurry processes that while the solid particles are retained in suspension they are repeatedly passed or recirculated through the reaction zone. The term "slurry" is therefore to be distinguished from "sludge," which consists of deposited or fully sedimented particles. Similarly, the slurry process herein described is to be distinguished from the so-called "sludge return" processes in which the solids are deposited in a sedimentation step, the deposited solids collected and returned to a preceding step for resuspension, mixing and reuse with water in the preceding step.

It will be obvious to persons skilled in the art, on consideration hereof, that various changes can be made in the method as well as in the apparatus or plant and individual parts thereof. Such modifications are intended to be covered by the claims appended.

I claim:

1. A method of liquid treatment comprising the steps of mixing liquid to be treated with a first precipitating reagent of a nature to form solid particles of a certain kind, clarifying the resulting mixture, mixing the clarified liquid with a second precipitating reagent of a nature to form solid particles of a different kind, separating the then resulting mixture into treated liquid and a slurry containing the last named solid particles, transferring a portion of such slurry to the first-mentioned mixing step, retaining another portion of such slurry in the last-mentioned mixing step, removing separated solids to waste and removing treated liquid separated from said last-mentioned mixing step.

2. A method of treating hard and turbid water comprising the steps of mixing water to be treated with a coagulant for removing matter causing turbidity, separating the coagulate from the water, mixing the separated effluent with a precipitant for matter causing hardness and a slurry containing a suspension of solids separated and collected from previously treated water, mixing and circulating the slurry, precipitant and separated effluent so that the formation of a precipitate from the reaction of the precipitant and the separated effluent occurs in the presence of the solids suspended in said slurry, separating and withdrawing treated water from said mixture, transferring portions of the slurry to the first-mentioned mixing step, and removing separated solids to waste.

3. A method of water treatment comprising the steps of mixing the water to be treated with a coagulant and a slurry containing solid particles precipitated and collected from previously treated water in a subsequent treating step, clarifying the water, removing separated solids to waste, mixing the clarified water in a turbulent reaction zone with a precipitant and a slurry containing unsedimented solid particles formed in and collected from previously treated water, circulating such mixture through said reaction zone and into a pool of such slurry, passing a quantity of slurry from within such pool into said reaction zone for admixture with additional quantities of clarified water, displacing treated water from the upper portion of said pool of slurry, withdrawing a predetermined portion of the slurry for admixture with the water to be treated and coagulant in the first mentioned mixing step, and controlling the amount of said slurry by withdrawal of solids therefrom.

4. In a process of clarifying and softening a turbid and hard water which includes the steps of first clarifying water in a clarification zone and subsequently softening the clarified water in a softening zone, said softening step including the mixing of the clarified water, a softening reagent and a slurry containing particles formed and accumulated while continuously maintained in suspension in said softening zone, a method of coagulating turbidity imparting impurities in said turbid hard water comprising the step of rapidly mixing water to be treated with a coagulant and with a slurry of unsedimented particles obtained from the subsequent softening zone; clarifying the mixture of water, coagulant and slurry; and withdrawing the clarified water for treatment in the said subsequent softening zone.

5. A method according to claim 4 wherein the mixing is effected by blades rotating with a peripheral velocity in the range of about 3 to 10 feet per second.

6. Apparatus for liquid treatment comprising a mixing chamber, means for delivering a reactant and liquid to be treated to said mixing chamber, mixing means in said chamber, a sedimentation chamber, a communication between the mixing chamber and the sedimentation chamber, a treating chamber, baffle means within said treating chamber forming a mixing compartment therein which is in open communication with the lower portion thereof, a rotatably driven stream projecting impeller operative to circulate liquid through said compartment and the lower portion only of said treating chamber at a rate sufficient to prevent sedimentation of particles from the circulated liquid, means for conducting effluent from the sedimentation chamber and a precipitant into the mixing compartment within the treating chamber, means for withdrawing fully treated liquid from above the lower portion of said treating chamber, means for discharging suspended solids from said treating chamber into the mixing chamber, and means for withdrawing solids from said sedimentation chamber.

7. Apparatus for the combined clarification and softening of a hard and turbid water, comprising a mixing chamber, means for delivering raw water and a reactant into the mixing chamber, means for discharging a suspension containing solid particles precipitated and collected in a subsequent treating step from previously treated water into said mixing chamber, means within said mixing chamber for thoroughly mixing the liquid, reactant and said suspension therein, a sedimentation chamber adjacent the mixing chamber, a communication between the mixing chamber and the sedimentation chamber, a liquid withdrawal means leading from an upper portion of said sedimentation chamber, a softening chamber, baffle means within said softening chamber forming a mixing compartment therein, a rotatably driven stream projecting impeller operative to circulate liquid through said compartment and the lower portion only of said softening chamber and to maintain particles in the circulated liquid in suspension, means for conducting effluent from the liquid withdrawal means within the sedimentation chamber into the mixing compartment within the softening chamber, means for discharging a precipitant into the mixing compartment of the softening chamber, means for withdrawing clarified and softened water from above the lower portion of the softening chamber, means for withdrawing suspended solids from said softening chamber below said means for withdrawing clarified water, means for delivering a predetermined portion of said suspension of solids into the means for discharging suspension containing solid particles, means for withdrawing another portion of said solids to waste, and means for withdrawing solids from said sedimentation chamber.

8. In the process of clarifying and softening a turbid hard water, the improvement which comprises the mixing of water to be treated in a mixing zone with a coagulating reagent and with slurry withdrawn from a body of slurry accumulated and maintained in a subsequent softening zone, the slurry in said body containing particles formed and collected while continuously held in suspension in water undergoing softening in said softening zone, separating solids and water, then passing the clarified water into said subsequent softening zone and there mixing the clarified water with a softening reagent and with the slurry maintained in the said subsequent softening zone, circulating said slurry to maintain the solids in suspension, separating clarified softened water from the upper surface of said slurry, withdrawing said softened water from above said slurry, continuously withdrawing a quantity of slurry and passing same back to the mixing zone to provide the slurry for mixing with the turbid hard water, and withdrawing another quantity of slurry to waste.

9. In a process of clarifying and softening a turbid and hard water wherein the water is first clarified and the clarified water is then softened, said water softening step comprising maintaining a body of slurry containing solids accumulated from previously softened water, circulating said slurry through a mixing and reaction zone, introducing water to be softened and a softening reagent into said mixing and reaction zone and separating softened water from the upper surface of said slurry, the improvement in the clarifying step which comprises mixing the turbid hard water with a coagulant and with slurry obtained from the softening step, passing the mixture into a quiescent sedimentation zone, sedimenting solid particles in said sedimentation zone, and withdrawing clarified water from the upper portion of the sedimentation zone for delivery into said softening step.

10. Apparatus for the combined clarification and softening of a hard and turbid water comprising a tank, partition walls within said tank dividing the same into a mixing chamber, a sedimentation chamber and a softening chamber, baffle means within said softening chamber dividing the same into a mixing and reaction zone and a clarified liquid zone, means for delivering raw water and coagulant into the mixing chamber, means including a conduit leading from an intermediate portion of said softening chamber into said mixing chamber, and means for producing flow of liquid and suspended solids from the softening chamber into the mixing chamber through said conduit, an outlet from the mixing chamber into the sedimentation chamber, a passageway leading from an upper portion of the sedimentation chamber into the mixing and reaction zone of the softening chamber, a rotatably driven stream projecting impeller within the mixing and reaction zone so constructed and positioned as to agitate liquid throughout said zone, an inlet for delivering a hardness precipitating reagent into the water entering the mixing zone, an outlet for clarified softened water from the upper portion of the clarified liquid zone, means for withdrawing solids to waste from said softening chamber, and means for discharging deposited solids from said sedimentation chamber.

WALTER H. GREEN.